(12) United States Patent
Kim et al.

(10) Patent No.: US 9,413,265 B2
(45) Date of Patent: Aug. 9, 2016

(54) DRIVING DEVICE OF SYNCHRONOUS RECTIFICATION APPARATUS

(71) Applicant: LSIS CO., LTD., Anyang-si, Gyeonggi-do (KR)

(72) Inventors: Woo Sup Kim, Seoul (KR); Chul Woo Park, Seoul (KR); Jae Ho Lee, Bucheon-si (KR); Hong Tae Park, Cheongju-si (KR)

(73) Assignee: LSIS CO., LTD., Anyang-si (KR)

( * ) Notice: Subject to any disclaimer, the term of this patent is extended or adjusted under 35 U.S.C. 154(b) by 0 days.

(21) Appl. No.: 14/459,073

(22) Filed: Aug. 13, 2014

(65) Prior Publication Data

US 2015/0180364 A1    Jun. 25, 2015

(30) Foreign Application Priority Data

Dec. 20, 2013   (KR) ......................... 10-2013-0160676

(51) Int. Cl.
*H02M 7/217*   (2006.01)
*H02M 3/335*   (2006.01)

(52) U.S. Cl.
CPC .......... *H02M 7/217* (2013.01); *H02M 3/33507* (2013.01); *H02M 3/33592* (2013.01); *Y02B 70/1475* (2013.01)

(58) Field of Classification Search
CPC .............. H02M 3/337; H02M 3/3385; H02M 3/33507; H02M 3/33523; H02M 1/33; H02M 1/4208; H02M 1/4225; H02M 2001/0032; Y02B 70/126; Y02B 70/1433
USPC ...................... 323/17, 21.09, 89, 97, 125, 127
See application file for complete search history.

(56) References Cited

U.S. PATENT DOCUMENTS

| 5,939,871 A * | 8/1999 | Tanaka ................ H02M 3/1563 323/285 |
| 6,426,884 B1 | 7/2002 | Sun |

(Continued)

FOREIGN PATENT DOCUMENTS

| JP | 03-253260 | 11/1991 |
| JP | 06-41386 | 5/1994 |

(Continued)

OTHER PUBLICATIONS

Kubota, et al., "Synchronous Rectification Circuit Using a Current Transformer," Telecommunications Energy Conference, IEEE, XP010523198, Sep. 2000, p. 267.

(Continued)

*Primary Examiner* — Yemane Mehari
(74) *Attorney, Agent, or Firm* — Lee, Hong, Degerman, Kang & Waimey; Jonathan Kang; Richard Salfelder

(57) ABSTRACT

A driving device of a synchronous rectification apparatus is provided. The driving device includes a voltage detection part disposed on a power input terminal to detect a voltage value of a power inputted through the power input terminal, an adjustment part receiving the voltage value detected through the voltage detection part, the adjustment part adjusting the receive voltage value to output the adjusted voltage value, and a comparison part receiving the voltage value adjusted through the adjustment part into a positive terminal and a synchronous rectification starting value into a negative terminal, the comparison part outputting an command value of the synchronous rectification apparatus, which is obtained by comparing the received voltage value with the synchronous rectification starting value.

8 Claims, 3 Drawing Sheets

(56) References Cited

U.S. PATENT DOCUMENTS

| | | |
|---|---|---|
| 6,961,253 B1 | 11/2005 | Cohen |
| 7,209,334 B2 * | 4/2007 | Gentillet ............... G06F 1/206 361/93.1 |
| 7,352,599 B2 * | 4/2008 | Shimada ............ H02M 1/4225 363/79 |
| 2007/0008757 A1 | 1/2007 | Usui et al. |
| 2012/0026756 A1 | 2/2012 | Fan et al. |

FOREIGN PATENT DOCUMENTS

| | | |
|---|---|---|
| JP | 09-215319 | 8/1997 |
| JP | 2003-324956 | 11/2003 |
| JP | 2005-287249 | 10/2005 |
| JP | 2010-206858 | 9/2010 |
| KR | 10-1240746 | 3/2013 |
| KR | 10-1444553 | 9/2014 |
| SE | WO 2013113354 A1 * | 8/2013 ........ H02M 3/33592 |
| WO | 2013/113354 | 8/2013 |

OTHER PUBLICATIONS

European Patent Office Application Serial No. 14188737.2, Search Report dated Jun. 2, 2015, 7 pages.

Korean Intellectual Property Office Application Serial No. 10-2013-0160676, Notice of Allowance dated Feb. 12, 2015, 2 pages.

Japan Patent Office Application Serial No. 2011-172149, Office Action dated Oct. 27, 2015, 3 pages.

* cited by examiner

DRIVING DEVICE OF SYNCHRONOUS RECTIFICATION APPARATUS

CROSS-REFERENCE TO RELATED APPLICATIONS

Pursuant to 35 U.S.C. §119(a), this application claims the benefit of earlier filing date and right of priority to Korean Patent Application No. 10-2013-0160676, filed Dec. 20, 2013, the contents of which are all hereby incorporated by reference herein in its entirety.

BACKGROUND

The present disclosure relates to a driving device of a synchronous rectification apparatus, and particularly, to a driving device of a synchronous rectification apparatus, which is capable of driving the synchronous rectification apparatus to generate uniform output current regardless of an input voltage in a charging device for charging a low voltage battery.

Low-voltage battery chargers are embedded in eco-friendly vehicles so as to replace generators of engine vehicles. Such a low-voltage battery charger uses energy stored in a high-voltage battery to charge a low-voltage battery having a voltage of about 12 V.

Low-voltage battery chargers have operation characteristics in which conditions such as an input voltage, input current, an output voltage, and output current vary when operating.

Therefore, synchronous rectification apparatuses are being generally used as the low-voltage battery chargers to realize high efficiency having low-voltage high-output current characteristics.

FIG. 1 is a view illustrating a starting device of a synchronous rectification apparatus according to a related art.

Referring to FIG. 1, a driving device of a synchronous rectification apparatus includes a protection part 11 and a comparison part 12.

The driving device of the synchronous rectification apparatus is designed so that the driving device is stopped in operation when an amount of output current is small and operates when load current increases, so as to improve efficiency under a light load and prevent the synchronous rectification apparatus from being damaged due to discontinuous current.

The protection part 11 is configured to protect the synchronous rectification apparatus and is constituted by division resistors.

That is, the protection part 11 includes a first resistor R1 having a first terminal connected to a reference voltage and a second terminal connected to a first terminal of a second resistor R2 and the second resistor R2 having the first terminal connected to the second terminal of the first resistor R1 and a grounded second terminal.

The protection part 11 uses the division resistors to output division resistance values according to an input voltage and the reference voltage. The input voltage represents a voltage inputted into the protection part 11. In detail, the input voltage represents a voltage outputted through a high voltage battery.

The comparison part 12 receives the division resistance value outputted through the protection part 11 into a negative terminal (−) and a command starting value into a positive terminal (+). The comparison part 12 outputs a command value according to a result obtained by comparing the value inputted into the negative terminal to the value inputted into the positive value.

Here, a preset specific command value and output current may be used as the command starting value. On the other hand, the input current may be used as the command starting value when a primary coil of the low-voltage battery charger is controlled.

In the above-described low-voltage battery charger that is designed to control the charging voltage and current of the low voltage battery at the primary coil, it is necessary to correct the command starting value in a case where it is required to accurately control the charging voltage and current when an actual product is embodied due to efficiency, waveform, and duty losses.

Particularly, when a voltage of the high voltage battery which is an input value of the low-voltage battery charger is changed, the input current with respect to the output current may have different values under the same output power to change the starting value of the synchronous rectification apparatus.

When the input voltage increases in a state where the input power is uniform with respect to the predetermined output voltage and output current, it seems that the input current is relatively low. Thus, primary current may operate at a low value.

That is, since the command starting value is set on the basis of the primary current in case of the primary coil control method, the synchronous rectification apparatus operates at a point where the output current is relatively high under the high input voltage than the low input voltage according to the command starting value when the resistors R1 and R2 have consistent values, thereby reducing light load efficiency.

Here, although it is possible to correct command starting value by changing the command starting value, the command starting value needs to be calculated whenever the above-described situations occurs. As a result, time delay occurs, and the command starting value reacts slowly after the voltage of the high battery is converted. Thus, it may be difficult to quickly correct the command starting value.

SUMMARY

Embodiments provide a driving device of a synchronous rectification apparatus in which since a starting value of the synchronous rectification apparatus is quickly and constantly converted according to output current by using an active switching device and a comparison unit even though an input voltage of a low-voltage battery charger, shortly, an output voltage of a high voltage battery is changed, the synchronous rectification apparatus may operate at output the constant output current regardless of the input voltage.

The feature of the embodiment is not limited to the aforesaid, but other features not described herein will be clearly understood by those skilled in the art from descriptions below.

In one embodiment, a driving device of a synchronous rectification apparatus includes: a voltage detection part disposed on a power input terminal to detect a voltage value of a power inputted through the power input terminal; an adjustment part receiving the voltage value detected through the voltage detection part, the adjustment part adjusting the receive voltage value to output the adjusted voltage value; and a comparison part receiving the voltage value adjusted through the adjustment part into a positive terminal and a synchronous rectification starting value into a negative terminal, the comparison part outputting an command value of the synchronous rectification apparatus, which is obtained by comparing the received voltage value with the synchronous rectification starting value.

The adjustment part may adjust the voltage value inputted into the positive terminal to a voltage value in inverse proportion to the voltage value detected through the voltage detection part.

The driving device may further include a protection part disposed between the adjustment part and the comparison part to determine an initial operation value for operating the adjustment part.

The protection part may be connected to a reference voltage terminal to output the reference voltage value to the positive terminal when the adjustment part abnormally operates.

The synchronous rectification starting value may be set on the basis of an input current value with respect to the power inputted through the power input terminal.

The voltage detection part may be provided with first and second resistor connected in series to each other.

The adjustment part may include a switching element including a gate electrode connected between the first and second resistors, a drain electrode connected a first terminal of a third resistor, and a source electrode connected a first terminal of a fourth resistor; the third resistor including the first terminal connected to the drain electrode of the switching element and a second terminal connected to a reference voltage; and the fourth resistor including the first terminal connected to the source electrode of the switching element and a second terminal connected to the ground.

The adjustment part may increase or decrease a voltage value inputted to the positive terminal according to the detected voltage value because drain current of the switching element increases in proportion to the detected voltage value, and the reference voltage and voltages of both terminals of the third resistor decrease in inverse proportion to the increased drain current.

The details of one or more embodiments are set forth in the accompanying drawings and the description below. Other features will be apparent from the description and drawings, and from the claims.

DETAILED DESCRIPTION OF THE EMBODIMENTS

Figure 1:
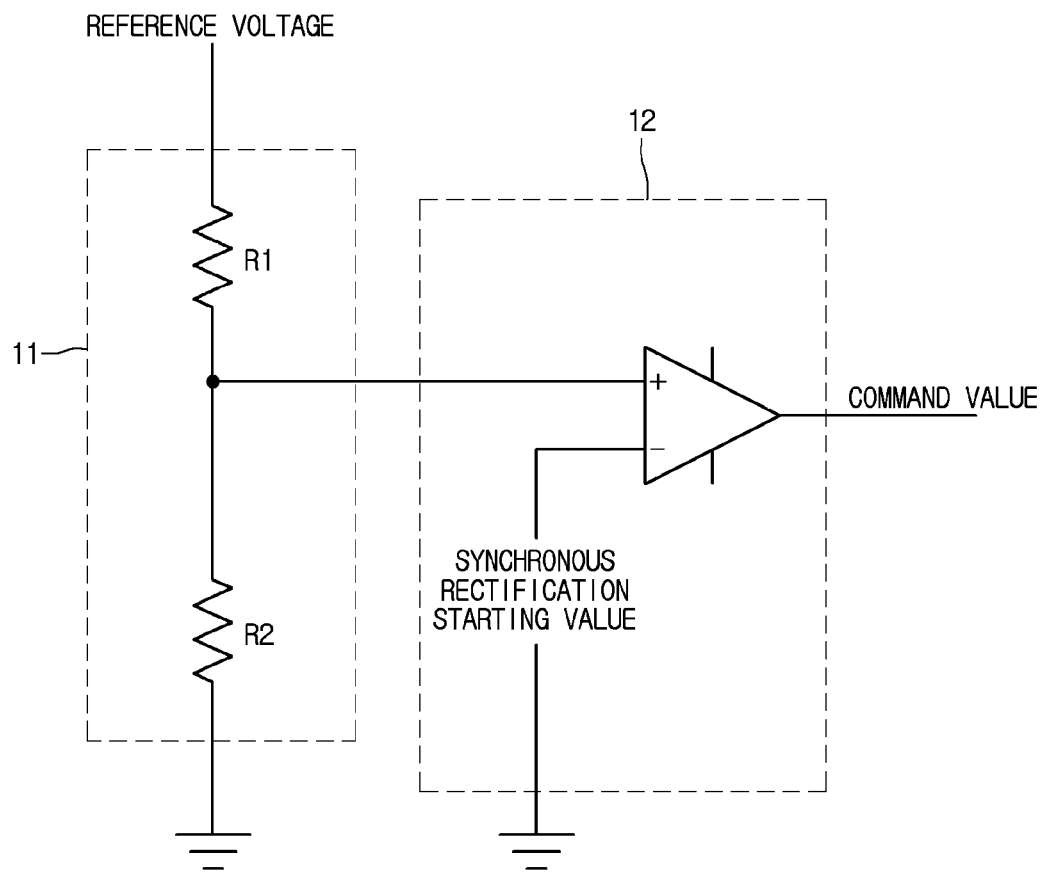
FIG. 1 is a view illustrating a starting device of a synchronous rectification apparatus according to a related art.

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present disclosure is only defined by scopes of claims. Like reference numerals refer to like elements throughout.

In the following description, detailed descriptions of well-known functions or constructions will be omitted since they would obscure the invention in unnecessary detail. Also, the terms used herein are defined according to the functions of the present disclosure. Thus, the terms may vary depending on user's or operator's intentions or practices. Therefore, the terms used herein must be understood based on the descriptions made herein.

Figure 2:
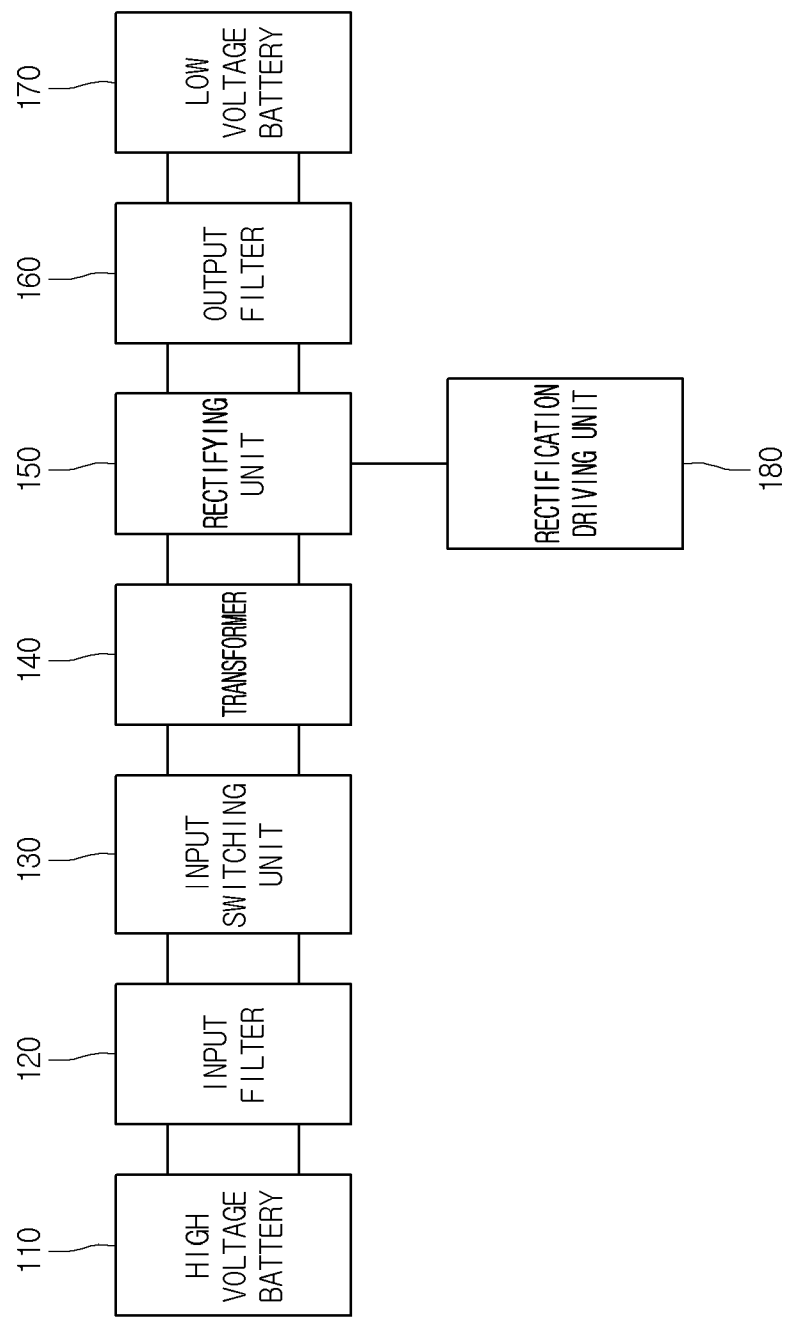
FIG. 2 is a schematic block diagram of a charging device according to an embodiment.

FIG. 2 is a schematic block diagram of a charging device according to an embodiment.

Referring to FIG. 2, the charging device includes a high voltage battery 110, an input filter 120, an input switching unit 130, a transformer 140, a rectifier 150, an output filter 160, a low voltage battery 170, and a rectification driving unit 180.

The high voltage battery 110 may be a fuel cell. The high voltage battery 110 may generate direct current (DC) power stored therein in a manner in which hydrogen ($H_2$) chemically reacts with oxygen ($O_2$) contained in the air to generate electric energy, and the generated electric energy is stored in a stack.

The high voltage battery 110 may be charged by the DC power supplied through a high voltage battery charger.

The input filter 120 blocks overcurrent of the DC power outputted through the high voltage battery 110.

The input switching unit 130 is provided with a plurality of switching elements and converts the DC power outputted through the input filter 120 into alternating current (AC) power.

The transformer 140 transforms the AC power converted through the input switching unit 130.

The rectifying unit 150 rectifies the AC power outputted through the transformer 140 to convert the AC power into the DC power.

The rectifying unit 150 may include a bridge rectifier. Here, a plurality of diodes constituting the bridge rectifier may be turned at only a voltage equal to or greater than a predetermined driving voltage to output an input power.

The rectifying unit 150 includes a plurality active switching elements.

The output filter 160 filters the DC power outputted through the rectifying unit 150 and transmits the filtered AC power to the low voltage battery 170 to charge the low voltage battery 170.

The rectifying driving unit 180 controls each of the active switching elements constituting the rectifying unit 150 so as to constantly convert output current of the rectifying unit 150.

Hereinafter, the detailed description with respect to the charging device will be described with reference to the accompanying drawings.

Figure 3:
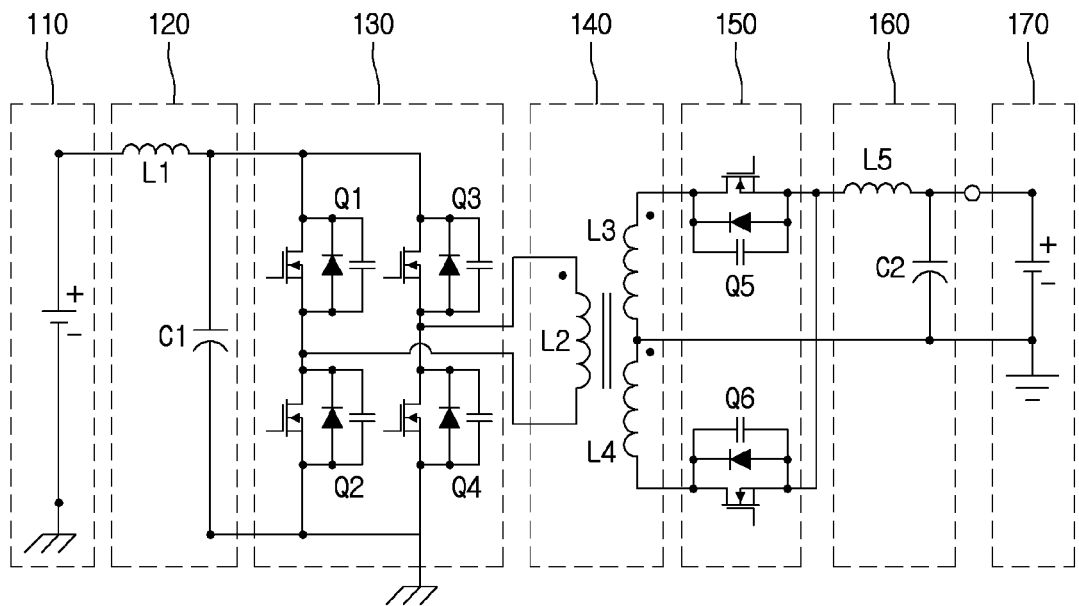
FIG. 3 is a detailed circuit diagram illustrating the charging device of FIG. 2.
Figure 4:
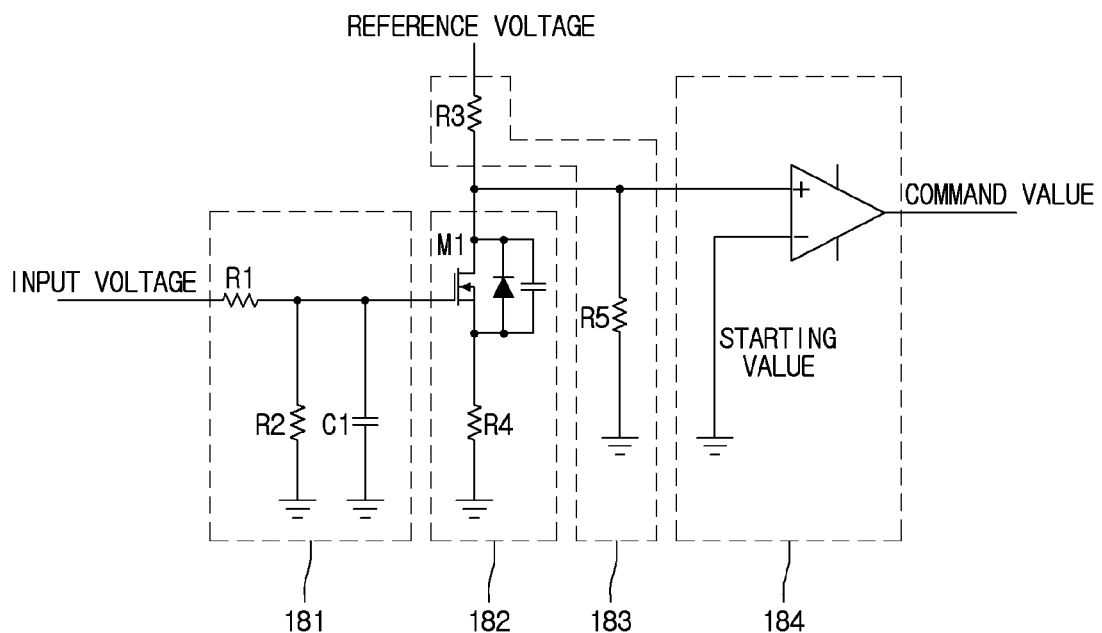
FIG. 4 is a detailed circuit diagram illustrating a rectification driving unit 180 of FIG. 2.

FIG. 3 is a detailed circuit diagram illustrating the charging device of FIG. 2, and FIG. 4 is a detailed circuit diagram illustrating a rectification driving unit 180 of FIG. 2.

Referring to FIG. 3, the input filter 120 includes a first inductor L1 and a first capacitor C1.

The first inductor L1 includes a first terminal connected to a positive terminal of the high voltage battery 110 and a second terminal connected to a first terminal of the first capacitor C1.

The first capacitor C1 includes the first terminal connected to the second terminal of the first inductor L1 and a second terminal connected to a source electrode of a second switching element Q2.

The input switching unit 130 includes a first switching element Q1, the second switching element Q2, a third switching element Q3, and a fourth switching element Q4.

The first switching element Q1 includes a drain electrode connected to the second terminal of the first inductor L1 and to the first terminal of the first capacitor C1 and a source electrode connected to a drain electrode of the second switching element Q2.

The second switching element Q2 includes the drain electrode connected to the source electrode of the first switching element Q1 and the source electrode connected to the second terminal of the first capacitor C1 and a source electrode of the fourth switching element Q4.

The third switching element Q3 includes a drain electrode connected to the drain electrode of the first switching element Q1 and a source electrode connected to a drain electrode of the fourth switching element Q4.

The fourth switching element Q4 includes the drain electrode connected to source electrode of the third switching element Q3 and the source electrode connected to the source electrode of the second switching element Q2.

Gate electrodes of the first to fourth switching elements Q1 to Q4 are connected to a digital signal processor (DSP) (not shown), and each of gate electrodes receives a gate signal supplied from the DSP.

Each of the first to fourth switching elements Q1 to Q4 includes a body diode of which one end is connected to the drain electrode and the other end is connected to the source electrode and a body capacitor.

The transformer 140 includes a second inductor L2, a third inductor L3, and a fourth inductor L4.

The second inductor L2 includes a first terminal connected between the source electrode of the third switching element Q3 and the drain electrode of the fourth switching element Q4 and a second terminal connected between the source electrode of the first switching element Q1 and the drain electrode of the second switching element Q2.

The third inductor L3 includes a first terminal connected to a drain electrode of a fifth switching element Q5 and a second terminal connected to a first terminal of the fourth inductor L4.

The fourth inductor L4 includes the first terminal connected to the second terminal of the third inductor L3 and a second terminal connected to a drain electrode of a sixth switching element Q6.

The rectifying unit 150 includes the fifth and sixth switching elements Q5 and Q6.

The fifth switching element Q5 includes the drain electrode connected to the first terminal of the third inductor L3 and a source electrode connected to a first terminal of a fifth inductor L5.

The sixth switching element Q6 includes the drain electrode connected to the second terminal of the fourth inductor L4 and a source electrode connected to the first terminal of the fifth inductor L5.

The output filter 160 includes the fifth inductor L5 and a second capacitor C2.

The fifth inductor L5 includes the first terminal connected to the source electrode of the fifth switching element Q5 and to the source electrode of the sixth switching element Q6 and a second terminal connected to the first terminal of the second capacitor C2 and to a positive terminal of the low voltage battery 170.

The second capacitor C2 includes the first terminal connected to the second terminal of the fifth inductor L5 and to the positive terminal of the low voltage battery 170 and a second terminal connected between the second terminal of the third inductor L3 and the first terminal of the fourth inductor L4.

Since the charging device including the above-described constitutions has a general circuit of a low voltage battery charger, its detailed description will be omitted.

The rectification driving unit 180 includes an input part 181, an adjustment part 182, a protection part 183, and a comparison part 184.

The input part 181 detects an output voltage value of the high voltage battery 110 to output the detected output voltage value. The input part 181 may be a division resistor including a plurality of resistors.

The output voltage value detected through the input part 181 is transmitted to the adjustment part 182.

The adjustment part 182 adjusts and outputs the output voltage value of the high voltage battery 110 detected through the input part 181.

The adjustment part 182 includes an active switching element. The output voltage of the input part 181 is applied to a gate of the active switching element. Thus, source and drain currents of the active switching element are changed according to the voltage inputted to the gate electrode. For example, when the voltage inputted into the gate electrode of the active switching element increases, the drain current of the active switching element increases. Therefore, a voltage reduced in inverse proportion to the inputted voltage may be inputted to the protection part 183.

Since the protection part 183 determines an initial operation value of the active switching element constituting the adjustment part 182 when the input voltage decreases, a command value for driving the rectifying unit 150 may be normally outputted when the adjustment part 182 is broken.

The comparison part 184 may receive the voltage value outputted from the protection part 182 through a positive terminal (+) and receive a rectification starting value through a negative terminal (−). The comparison part 184 compares the inputted voltage value to the inputted rectification starting value to output a command value of the synchronous rectification apparatus.

The detailed description with respect to the constitution of the rectification driving unit 180 will be described in detail.

The input part 181 includes a first resistor R1, a second resistor R2, and a first capacitor C1.

The first resistor R1 includes a first terminal connected to the input voltage and a second terminal connected to a first terminal of the second resistor R2.

The second resistor R2 includes the first terminal connected to the second terminal of the first resistor R1 and a grounded second terminal.

The first capacitor C1 includes a first terminal connected to the second terminal of the first resistor R1 and to the first terminal of the second resistor R2 and a grounded second terminal.

The adjustment part 182 includes an active switching element M1 and a fourth resistor R4. The protection part 183 includes a third resistor R3 and a fifth resistor R5.

The third resistor R3 includes a first terminal connected to a reference voltage and a second terminal connected to a drain electrode of the active switching element M1.

The active switching element M1 includes a gate electrode connected to the second terminal of the first resistor R1, to the first terminal of the second resistor R2, and to the first terminal of the first capacitor C1 and a source electrode connected to a first terminal of the fourth resistor R4.

The fourth resistor R4 includes the first terminal connected to the source electrode of the active switching element M1 and a grounded second terminal.

The fifth resistor R5 includes a first terminal connected to the second terminal of the third resistor R3 and to the drain electrode of the active switching element M1 and a grounded second terminal.

The comparison part 184 includes the positive terminal connected to the first terminal of the fifth resistor R5 and the negative terminal connected to a starting value generating device of the synchronous rectification apparatus.

An operation of the above-described rectification driving unit 180 will be described in the following description.

The output voltage of the high voltage battery is applied to the active switching element M1 through the first resistor R2 and the first capacitor C1.

Since voltages of both terminals of the fourth resistor R4 are determined by the voltage applied to the gate electrode of the active switching element M1, the active switching element M1 may be operated in an active area to adjust the source current. Here, the source current of the active switching element M1 is controlled to control the drain current, thereby adjusting a drain voltage. If this process is described with respect to the input voltage, the rectification driving unit 180 operates as follows.

When the output voltage of the high voltage battery increases, in other words, the input voltage applied to the rectification driving unit 180 increases, the drain current of the active switching element M1 increases. Thus, a difference between the reference voltage determining the drain voltage of the active switching element M1 and the voltages of both terminals of the third resistor R3 may be reduced.

Therefore, the drain voltage of the active switching element M1, shortly, the voltage of both terminals of the fifth resistor R5 may be reduced.

As the drain voltage of the active switching element M1 decreases, the voltage value applied to the positive terminal of the comparison part 184 decreases.

That is, the active switching element M1 may adjust the voltage value applied to the positive terminal of the comparison part 184 according to the input voltage to allow the command value of the rectification apparatus to vary according to the input voltage.

The current (the input current) of the input switching unit 130 may be used as the starting value of the synchronous rectification apparatus that is inputted to the negative terminal of the comparison part 184. Therefore, since the input current decreases when the input voltage with respect to the same output amount is high, the voltage inputted to the positive terminal may be reduced to generate the command value of the synchronous rectification apparatus at low input current.

On the contrary, when the input voltage decreases, the voltages of both terminals of the fourth resistor R4 are reduced to restrict the source current and drain current of the active switching element M1 so that each of the source current and drain current is low. Thus, the drain voltage of the active switching element M1 increases, and the increased voltage value is inputted to the positive terminal of the comparison part 184.

The fifth resistor R5 may determine an initial operation value of the active switching element M1 when the input voltage has the lowest value and may secure the operation of the synchronous rectification apparatus even though the active switching element M1 is broken.

Although the third resistor R3 is included in the protection part 183 in the above description, the embodiment is not limited thereto. For example, the third resistor R3 may be substantially included in the adjustment part 182.

According to the embodiment, since the starting value of the synchronous rectification apparatus is quickly and constantly converted according to the output current even though the output voltage of the high voltage battery is changed, the synchronous rectification apparatus may operate at output the constant output current regardless of the input voltage.

According to the embodiment, since the synchronous rectification apparatus is driven using the reference value even though the driving circuit is abnormal, the damage of the circuit due to the shutdown of the synchronous rectification apparatus may be prevented.

It should be understood that the exemplary embodiments described therein should be considered in a descriptive sense only and not for purposes of limitation. Descriptions of features or aspects within each embodiment should typically be considered as available for other similar features or aspects in other embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A driving device of a synchronous rectification apparatus, the driving device comprising:
   a protection part connected to a reference voltage terminal, and outputting an initial operation value for operating the synchronous rectification apparatus based on a reference voltage input from the reference voltage terminal;
   a comparison part receiving the initial operation value through the adjustment part into a positive terminal and a synchronous rectification starting value into a negative terminal, the comparison part outputting a command value of the synchronous rectification apparatus, which is obtained by comparing the initial operation value with the synchronous rectification starting value;
   a voltage detection part disposed on a power input terminal to detect a voltage value of a power input through the power input terminal; and
   an adjustment part having a switching element, receiving the voltage value detected from the voltage detection part through the switching element and adjusting the reference voltage based on the voltage value,
   wherein the initial operation value is changed according to the reference voltage adjusted through adjusting part.

2. The driving device according to claim 1, wherein the adjustment part adjusts the reference voltage in inverse proportion to the voltage value detected through the voltage detection part.

3. The driving device according to claim 1, wherein the protection part is disposed between the adjustment part and the comparison part.

4. The driving device according to claim 3, wherein the protection part outputs the reference voltage input from the reference voltage terminal to the positive terminal when the adjustment part abnormally operates.

5. The driving device according to claim 1, wherein the synchronous rectification starting value is set on the basis of an input current value with respect to the power inputted through the power input terminal.

6. The driving device according to claim 1, wherein the voltage detection part is provided with first and second resistor connected in series to each other.

7. The driving device according to claim 6, wherein the switching element comprises a gate electrode connected between the first and second resistors, a drain electrode connected a first terminal of a third resistor, and a source electrode connected a first terminal of a fourth resistor and the a third resistor comprising the first terminal connected to the drain electrode of the switching element and a second terminal connected to a reference voltage;

a fourth resistor comprising the first terminal connected to the source electrode of the switching element and a second terminal connected to the ground.

8. The driving device according to claim 7, wherein the adjustment part increases and decreases the initial operation value input to the positive terminal according to the detected voltage value because drain current of the switching element increases in proportion to the detected voltage value, and the reference voltage and voltages of both terminals of the third resistor decrease in inverse proportion to the increased drain current.

\* \* \* \* \*